United States Patent
Graney

(10) Patent No.: US 7,581,743 B2
(45) Date of Patent: Sep. 1, 2009

(54) BICYCLE REAR WHEEL SUSPENSION SYSTEM WITH CONTROLLED VARIABLE SHOCK RATE

(75) Inventor: Joseph E. Graney, Santa Cruz, CA (US)

(73) Assignee: Santa Cruz Bicycles, Inc., Santa Cruz, CA (US)

( * ) Notice: Subject to any disclaimer, the term of this patent is extended or adjusted under 35 U.S.C. 154(b) by 365 days.

(21) Appl. No.: 11/274,395

(22) Filed: Nov. 14, 2005

(65) Prior Publication Data

US 2007/0108725 A1    May 17, 2007

(51) Int. Cl.
B62K 1/00    (2006.01)
(52) U.S. Cl. ........................................ 280/284
(58) Field of Classification Search ............ 280/283, 280/284
See application file for complete search history.

(56) References Cited

U.S. PATENT DOCUMENTS

| | | | | |
|---|---|---|---|---|
| 4,561,519 A | * | 12/1985 | Omori | 180/227 |
| 4,582,343 A | | 4/1986 | Waugh | |
| 4,682,675 A | | 7/1987 | Eddy, Jr. | |
| 4,753,314 A | * | 6/1988 | Tsukiji | 180/227 |
| 5,409,248 A | | 4/1995 | Williams | |
| 5,441,292 A | * | 8/1995 | Busby | 280/284 |
| 5,586,780 A | * | 12/1996 | Klein et al. | 280/275 |
| 5,592,999 A | | 1/1997 | Matsuura et al. | |
| 5,816,356 A | | 10/1998 | Jansson et al. | |
| 6,056,307 A | * | 5/2000 | Busby et al. | 280/284 |
| 6,109,636 A | * | 8/2000 | Klein et al. | 280/284 |
| 6,164,676 A | | 12/2000 | Wilcox | |
| 6,244,610 B1 | * | 6/2001 | Kramer-Massow | 280/283 |
| 6,286,642 B1 | | 9/2001 | Yi | |
| 6,439,593 B1 | * | 8/2002 | Tseng | 280/284 |
| 6,450,520 B1 | | 9/2002 | Girard | |
| 6,488,301 B2 | | 12/2002 | Klassen et al. | |
| 6,581,711 B1 | | 6/2003 | Tuluie | |
| 6,581,950 B1 | | 6/2003 | Ellsworth | |
| 6,823,958 B2 | | 11/2004 | Domenicali et al. | |
| 6,845,998 B2 | * | 1/2005 | Probst | 280/284 |
| 6,863,291 B2 | | 3/2005 | Miyoshi | |
| 7,128,329 B2 | * | 10/2006 | Weagle | 280/284 |
| 7,178,620 B2 | * | 2/2007 | Toyoda | 180/227 |
| 7,296,815 B2 | * | 11/2007 | Ellsworth et al. | 280/284 |

* cited by examiner

*Primary Examiner*—Kevin Hurley
(74) *Attorney, Agent, or Firm*—Michael J. Hughes

(57) ABSTRACT

The present invention is a bicycle including a bicycle frame and a rear wheel suspension system that is attached to the frame. The rear wheel suspension system includes a rear wheel swingarm and a shock absorber that is engaged to the swingarm to control the motion of a rear wheel of the bicycle. A change in the vertical wheel travel ($\Delta VWT$) of the rear wheel is related to a change in the length of the shock absorber ($\Delta SL$), providing a shock rate (SR) according to the relationship:

$$SR = \Delta SL / \Delta VWT.$$

The shock rate (SR) changes throughout the vertical wheel travel of the rear wheel, such that the change in the shock rate $dSR/dVWT$ has a change in sign as the rear wheel travels through its vertical wheel travel. The shock rate may at first decrease in value and subsequently increase, or initially increase in value and subsequently decrease throughout the vertical wheel travel of the rear wheel. In various exemplary embodiments the swingarm may be attached to the frame at a single pivot point or through a linkage system.

19 Claims, 8 Drawing Sheets

BICYCLE REAR WHEEL SUSPENSION SYSTEM WITH CONTROLLED VARIABLE SHOCK RATE

BACKGROUND OF THE INVENTION

1. Field of the Invention

The invention generally relates to a shock absorbing rear wheel suspension apparatus for a bicycle, and more particularly to a rear wheel suspension having a controlled variable shock rate.

2. Description of the Prior Art

A variety of rear wheel suspension systems have been used on bicycles to improve performance. Many of these suspension systems are complicated structures involving a plurality of frame members, linkages of the swingarm frame members to other bicycle frame members and the installation of a shock absorber within the frame members to control the motion of the swingarm and the rear wheel engaged therewith.

One such prior art suspension system is disclosed in U.S. Pat. No. 6,361,059 which describes a bicycle with a rear wheel suspension having a single pivot axis that is located proximate the bottom bracket of the bicycle frame. A top portion of the swingarm, proximate the seat stays, is engaged to a shock absorber which controls the motion of the rear wheel swingarm. Another prior art suspension system is disclosed in U.S. Pat. No. 6,206,397 in which a bottom portion of the swingarm is engaged by a first linkage proximate the bottom bracket, and an upper portion of the swingarm proximate the seat stay is engaged with a second linkage proximate the top tube of the bicycle frame. A shock absorber is engaged to the swingarm to control the motion of the swingarm and therefore the rear wheel of the bicycle.

In analyzing the performance of bicycle frames including those disclosed in the prior art, a comparison can be made between the vertical wheel travel distance that the rear wheel moves upward ($\Delta$VWT) and the change in the length of the shock absorber ($\Delta$SL). The ratio of these two measurements, the change in the shock absorber length divided by the change in vertical rear wheel travel ($\Delta$SL/$\Delta$VWT) is called the shock rate (SR). In various bicycle frame designs, the shock rate can be approximately constant, it can increase as the vertical wheel travel increases or it can decrease as the vertical wheel travel increases.

Controlling the shock rate can provide improved bicycle performance and the present invention is directed to a bicycle rear wheel suspension system in which the shock rate is variable and controllable to provide improved bicycle performance characteristics.

SUMMARY OF THE INVENTION

The present invention is a bicycle including a bicycle frame and a rear wheel suspension system that is attached to the frame. The rear wheel suspension system includes a rear wheel swingarm and a shock absorber that is engaged to the swingarm to control the motion of a rear wheel of the bicycle. A change in the vertical wheel travel ($\Delta$VWT) of the rear wheel is related to a change in the length of the shock absorber ($\Delta$SL), providing a shock rate (SR) according to the relationship:

$$SR = \Delta SL / \Delta VWT.$$

The shock rate (SR) changes throughout the vertical wheel travel of the rear wheel, such that the change in the shock rate dSR/dVWT has a change in sign as the rear wheel travels through its vertical wheel travel. The shock rate may at first decrease in value and subsequently increase, or initially increase in value and subsequently decrease throughout the vertical wheel travel of the rear wheel. In each case, the rate of change of the shock rate includes a change in sign, from positive to negative or from negative to positive. In various exemplary embodiments the swingarm may be attached to the frame at a single pivot point or through a linkage system.

It is an advantage of the bicycle of the present invention that it increases traction and control by keeping the rear wheel on the ground.

It is another advantage of the bicycle of the present invention that it increases rider comfort by providing more vertical wheel travel for a given bump.

It is a further advantage of the bicycle of the present invention that it includes a rear wheel suspension system having a rate of change of the shock rate with respect to the vertical wheel travel that has a change in sign, which provides for better bicycle control characteristics.

It is yet another advantage of the bicycle of the present invention that it has a rear suspension system having a rate of change of the shock rate with respect to the vertical wheel travel that has a change in sign from negative to positive which provides better control for preventing the end of the vertical wheel travel from bottoming out.

It is yet a further advantage of the bicycle of the present invention that it has a rear suspension system having a rate of change of the shock rate with respect to the vertical wheel travel that has a change in sign from positive to negative which provides for maximizing vertical wheel travel when used with a shock absorber that has an increasing spring rate.

These and other features and advantages of the present invention will no doubt become apparent to those skilled in the art upon reading the following detailed description which makes reference to the several figures of the drawing.

IN THE DRAWINGS

The following drawings are not made to scale of actual device, and are provided for illustration of the invention described herein.

DETAILED DESCRIPTION OF THE PREFERRED EMBODIMENTS

Figure 1:
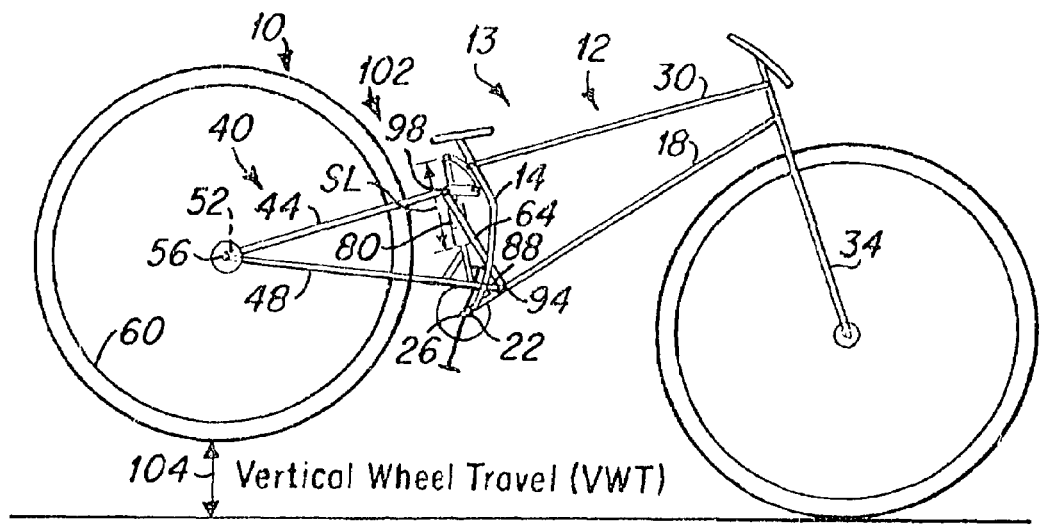
FIG. 1 is a schematic drawing of a side view of a bicycle illustrating an embodiment of a wheel suspension system of the present invention.

FIG. 1 depicts a first embodiment of a rear wheel suspension system 10 engaged with a bicycle frame 12 of a bicycle 13 of the present invention. The bicycle frame 12 generally includes a seat tube 14 and a down tube 18, both of which are attached to a bottom bracket 22 that houses a pedal assembly 26, a top tube 30, and a front fork 34. These elements are typically welded or otherwise secured together to define the frame 12 of the bicycle. Although the frame 12 typically includes all of the foregoing members, alternative embodiments can have more or less than all of the foregoing members, and can include them in various forms, sizes, and configurations, and still achieve the intended functionality and beneficial aspects of the invention.

The rear wheel suspension system 10 generally includes a rear wheel swingarm 40 that includes a pair of seat stays 44 and a pair of chain stays 48 that are joined to each other at their rearward ends 52 proximate the axle 56 of the rear wheel 60. A pair of front stays 64 are engaged between the chain stays 48 and the seat stays 44 to provide a rigid triangular structure for the swingarm. A shock absorber 80 is engaged to the swingarm to control the motion of the swingarm relative to the bicycle frame members, thereby controlling the motion of the rear wheel. In a typical configuration of the swingarm 40, the seat stays 44, chain stays 48 and front stays 64 are provided in corresponding pairs, with one stay member of each pair positioned on either side of the rear wheel. The rear wheel suspension stays 44, 48 and/or 64 can also include one or more elements such as conventional braze-on elements (not shown) to secure cables and brakes and the like to the frame and keep them away from interfering with the movement and operation of the bicycle. Persons of ordinary skill in the art will appreciate that the exact configuration and relationship between the seat stays, chain stays, front stays and attachment points with frame members can vary depending on, among other things, the size of the bicycle frame, and the size of the rear wheel.

In the bicycle embodiment 13 depicted in FIG. 1, the lower frontward end of the swingarm structure 40, proximate the frontward end 88 of the chain stays 48, is pivotally attached utilizing a pivot pin 94 or the like to the bicycle frame 12 proximate the bottom bracket 22, such that the swingarm rotates about the single pivot axis 94. The upper end of the swingarm, proximate the frontward end 98 of the seat stays 44 is engaged through a linkage structure 102 to the bicycle frame proximate the joinder of the seat tube 14 and top tube 30. The shock absorber 80 is engaged with the linkage to control the motion of the swingarm. A detailed description of the shock absorber engagement with the swingarm linkages and the controlled motion of the swingarm is also provided herebelow with the aid of FIG. 2.

When the bicycle depicted in FIG. 1 is utilized, the rear wheel is designed to move generally vertically upward 104 about the single pivot axis 94 when the rear wheel encounters an obstacle such as in rough terrain. Such a vertical wheel movement creates a corresponding change in the length of the shock absorber as the shock absorber piston arm moves inwardly or outwardly in response to the rear wheel vertical motion. A significant performance characteristic of the bicycle frame is related to the relationship between the change in shock absorber length ($\Delta SL$) and the change of the vertical wheel travel ($\Delta VWT$) related thereto. This parameter is called the "shock rate" (SR) where:

$$SR = \Delta SL / \Delta VWT$$

As is described herebelow, with an appropriate swingarm and linkage configuration the shock rate can be advantageously controlled, and specifically, the present invention relates to swingarm and linkage configurations in which the shock rate is controlled such that it initially increases and then decreases throughout the vertical wheel travel, or it initially decreases and subsequently increases throughout the vertical wheel travel. The rate of change of the shock rate with respect to the vertical wheel travel $dSR/dVWT$ therefore undergoes a sign change, either from positive to negative or negative to positive, as the rear wheel travels vertically. Detailed descriptions of exemplary embodiments of the present invention are next presented.

Figure 2:
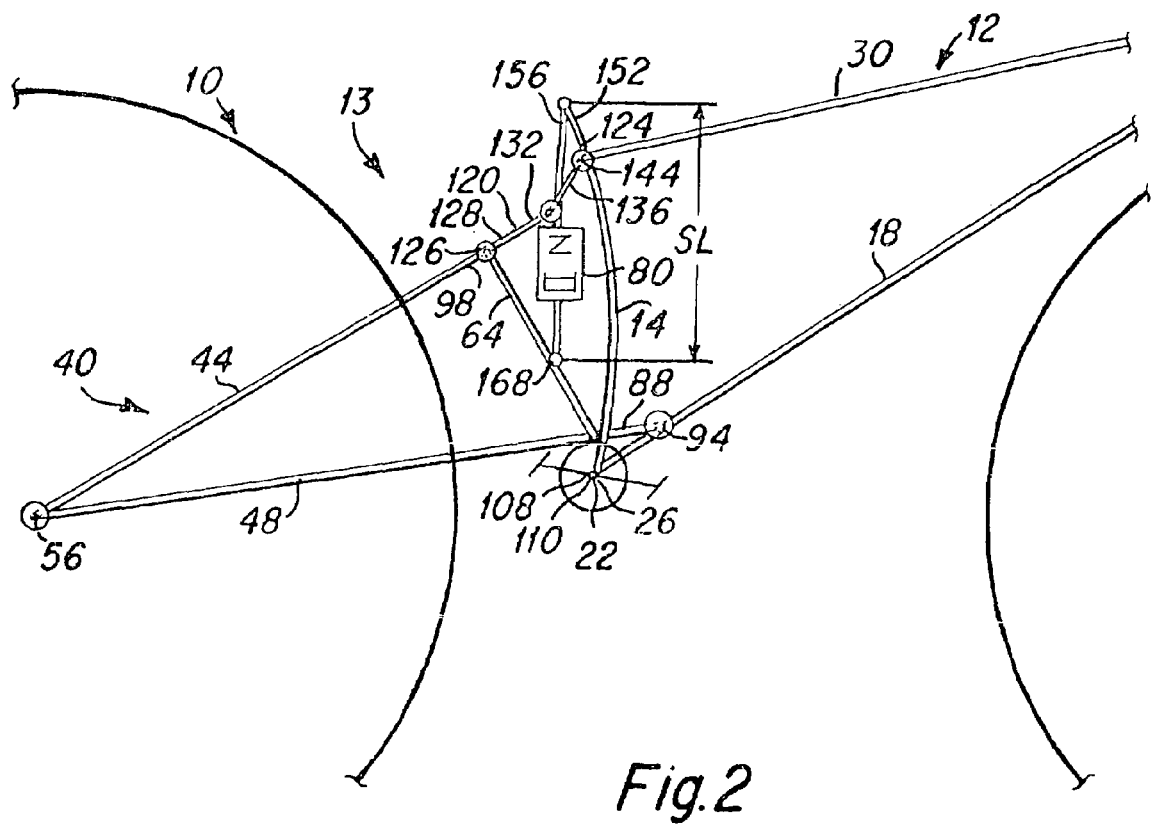
FIG. 2 is an enlarged drawing of the bicycle depicted in FIG. 1.

FIG. 2 is an enlarged depiction of the invention shown in FIG. 1 comprising a suspension system that moves the rear wheel axle 56 via a swingarm 40 about a single pivot 94. The swingarm motion is resisted by the shock-absorber 80, where the rate of vertical motion of the rear axle changes with respect to the rate of compression of the shock absorber according to the relationship $SR = \Delta SL / \Delta VWT$ as is described above.

The shock-absorber compression is controlled at one end by a plurality of links of the linkage 102, driven by the swingarm motion. This linkage 102 includes a straight connecting link 120 and a rocker link 124. The connecting link 120 is pivotally attached by a pivot 126 at a first end 128 to the forward end 98 of the seat stay 44, and pivotally attached at a second end 132 to a first arm 136 of the rocker link 124.

The rocker link 124 is pivotally attached at a generally centrally located pivot point 144 to the bicycle frame 12 and rotates about this pivot 144. A second arm 152 of the rocker link 124 is pivotally attached to the upper end 156 of the piston arm of the shock absorber 80. The lower end 160 of the shock absorber 80 is pivotally attached to the front stays 64 of the swingarm 40 with a shock mount 168, although it can also be attached to the chain stay 48.

In a first exemplary embodiment of the present invention 13, the swingarm includes a chain stay having a length of approximately 450 mm and a seat stay having a length of approximately 400 mm, where the included angle c between the chain stay and seat stay is approximately 20 degrees. The shock absorber is a compression shock absorber having an uncompressed length of approximately 200 mm, with a usable stroke of approximately 50 mm, such as a shock absorber manufactured by Fox Racing Shox, model Float®. The connecting link has a pivot to pivot length of approximately 60 mm, the first arm of the rocker link has a pivot to pivot length of approximately 50 mm and the second arm of the rocker link has a pivot to pivot length of approximately 45 mm, where the included angle between the arms of the rocker link is approximately 130 degrees. The lower shock mount position 168 is approximately 57 mm above, and 83 mm behind the swingarm pivot axis 94.

The swingarm pivot axis 94 is located approximately 70 mm above the axis 108 of the drive sprocket 110 of the bottom bracket 22. The horizontal distance between the swingarm pivot axis 94 and the drive sprocket axis 108 can be altered to suit various frame configurations. The angle between the rocker link arm 152 and the shock absorber is generally acute at the beginning of the travel (approximately 20 degrees), and becomes less acute as the suspension is compressed, with a total angle change of approximately 45 degrees throughout the range of travel.

The stationary pivot 144 of the rocker link 124 is located above and rearward of the main swingarm pivot 94, and above and forward of the connecting link/seat stay pivot 126. The connecting link/seat stay attachment point 126 is located above and rearward of the swingarm pivot axis 94, and the placement of the swingarm shock mount 168 is above and rearward of the swingarm pivot 94.

During rear wheel vertical travel, the rocker link 124 rotates in a counter-clockwise direction, with an increasing angular velocity during the first part of the wheel travel to a maximum angular velocity approximately halfway through the travel, and a decreasing angular velocity throughout the second portion of the wheel travel. The connecting link 120 rotates in a clockwise direction, and the angular velocity of the connecting link decreases during the range of vertical wheel travel. Where a different shock absorber is utilized, having a differing length or where a different amount of vertical wheel travel is desired, the dimensions given above may be varied in such a manner as to achieve the desired variable shock rate properties of the present invention.

It can therefore be appreciated that as the swingarm moves upward, the shock absorber compression is changed by both the motion of the links as described, and the motion of the swingarm. The sum of the rocker link motion and swingarm shock mount motion is configured to change the shock compression rate (SR) as the swingarm is moved throughout the range of travel, and FIG. 3 is a graph that depicts the shock rate (SR) throughout the vertical wheel travel (VWT) of the swingarm 40.

Figure 3:
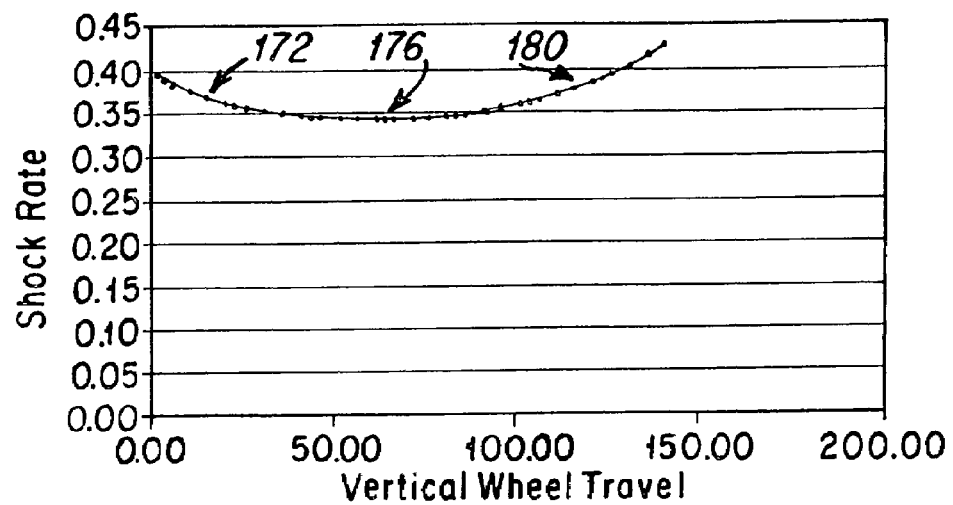
FIG. 3 is a graph depicting the shock rate versus vertical wheel travel of the bicycle depicted in FIGS. 1 and 2.
Figure 4:
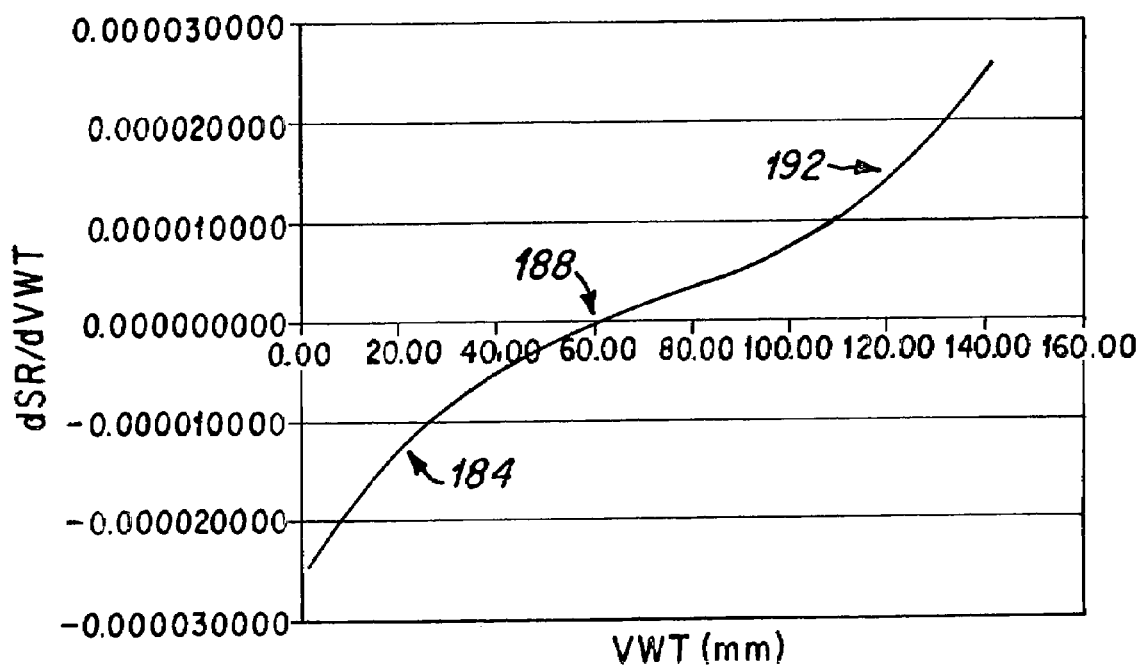
FIG. 4 is a graph depicting the change in the shock rate versus vertical wheel travel of the bicycle depicted in FIGS. 1 and 2.

As can be seen in FIG. 3, the shock rate (SR) has as initial portion 172 that decreases in value, has a portion 176 of essentially zero change in value and a portion 180 of increasing value. FIG. 4 is a graph depicting this change in the shock rate with respect to the vertical wheel travel. The rate of change in the shock rate is seen to first be negative 184, then zero 188, and then positive 192 throughout the vertical wheel travel. The result is a shock rate that has a rate of change (dSR/dVWT) that has a negative value during the first portion 184 of the wheel travel, goes through a sign change at a zero change rate 188, and changes to a positive value during the later portion 192 of the wheel travel as shown in FIGS. 3 and 4.

Figure 5:
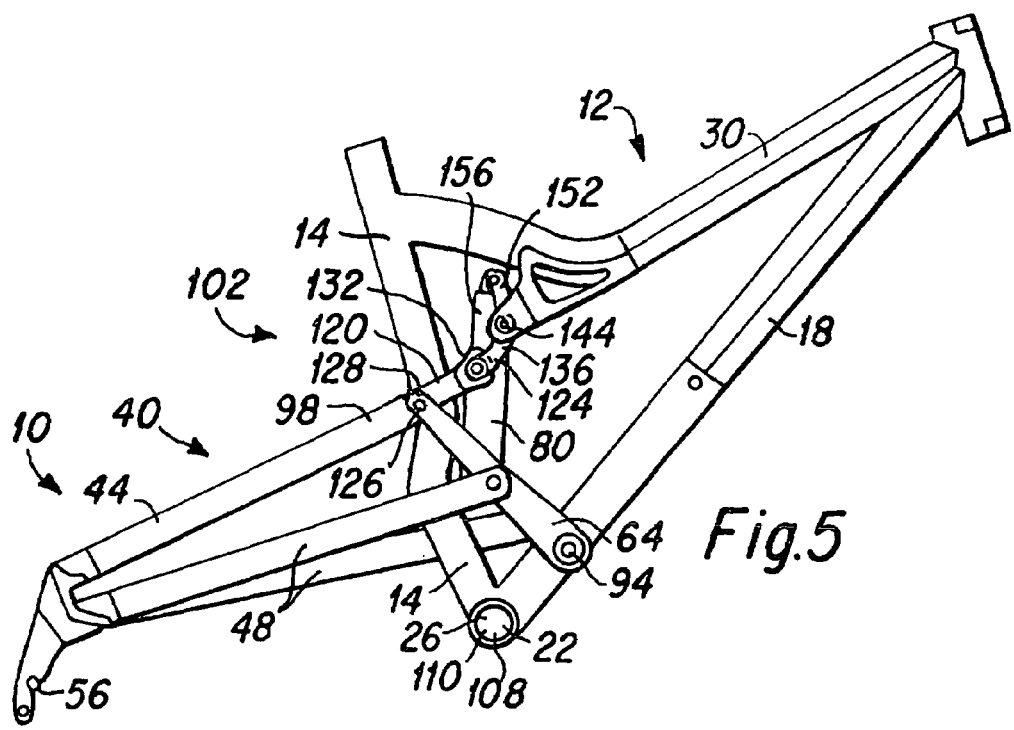
FIG. 5 is a side elevational view of a bicycle frame corresponding to the schematic drawings of FIGS. 1 and 2.
Figure 6:
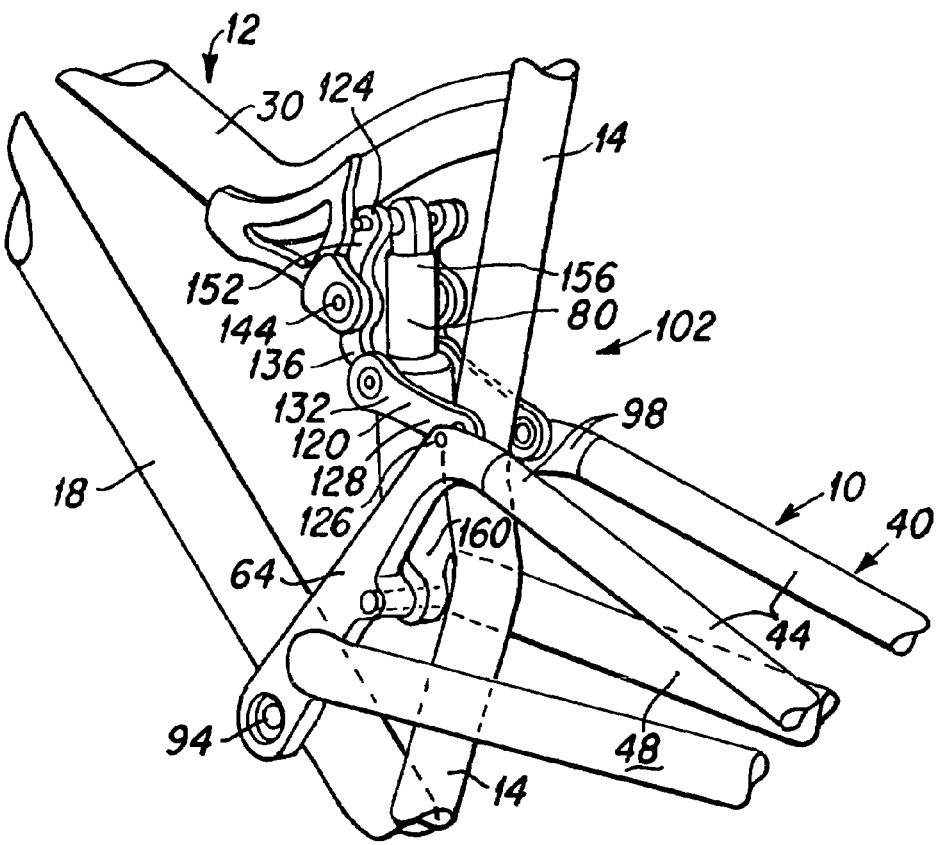
FIG. 6 is a perspective view of the bicycle frame depicted in FIG. 5.

For ease of comprehension, an exemplary bicycle frame is depicted in FIGS. 5 and 6 to illustrate how a bicycle frame can be constructed using the schematic shown of the linkage in FIGS. 1 and 2. FIG. 5 is a side elevational view and FIG. 6 is a perspective view taken from a rearward viewpoint towards the front of the bicycle frame, and structural elements of the frame depicted in FIGS. 5 and 6 that correspond to structural elements previously described with regard to FIGS. 1 and 2 are correspondingly numbered for ease of comprehension.

As depicted in FIGS. 5 and 6, the bicycle frame 12 generally includes the seat tube 14 and down tube 18, both of which are attached to a bottom bracket 22 that houses a pedal assembly 26, and the top tube 30. The rear wheel suspension system 10 generally includes the rear wheel swingarm 40 that includes the pair of seat stays 44 and chain stays 48 that are joined to each other at their rearward ends 52 proximate the rear wheel axle 56. The front stays 64 are engaged between the chain stays 48 and the seat stays 44 and the shock absorber 80 is engaged to the swingarm to control the motion of the swingarm relative to the bicycle frame members, thereby controlling the motion of the rear wheel.

The lower frontward end of the swingarm structure 40, proximate the frontward end of the front stays 64, is pivotally attached utilizing a pivot pin 94 or the like to the bicycle frame proximate the bottom bracket 22, such that the swingarm rotates about the single pivot axis 94. The upper end of the swingarm, proximate the frontward end 98 of the seat stays 44 is engaged through the linkage structure 102 to the bicycle frame proximate the joinder of the seat tube 14 and top tube 30.

The linkage 102 includes the connecting link 120 and the rocker link 124. The connecting link 120 is pivotally attached by a pivot 126 at a first end 128 to the forward end 98 of the seat stay 44, and pivotally attached at a second end 132 to a first arm 136 of the rocker link 124. The rocker link 124 is pivotally attached at pivot point 144 to the bicycle frame 12, and rotates about this pivot 144, and the second arm 152 of the rocker link 124 is pivotally attached to one end 156 of the shock-absorber 80. The second end 160 of the shock-absorber 80 is pivotally attached to the front stays 66 64 of the swingarm 40.

Various linkage configurations can be employed by those versed in the art to achieve a sign change of the dSR/dVWT value for varying amounts of rear wheel travel, as well as the peak values of both negative and positive values among others. The linkage shown is merely one embodiment of a bicycle suspension which has a rear axle path based on a single pivot.

Figure 7:
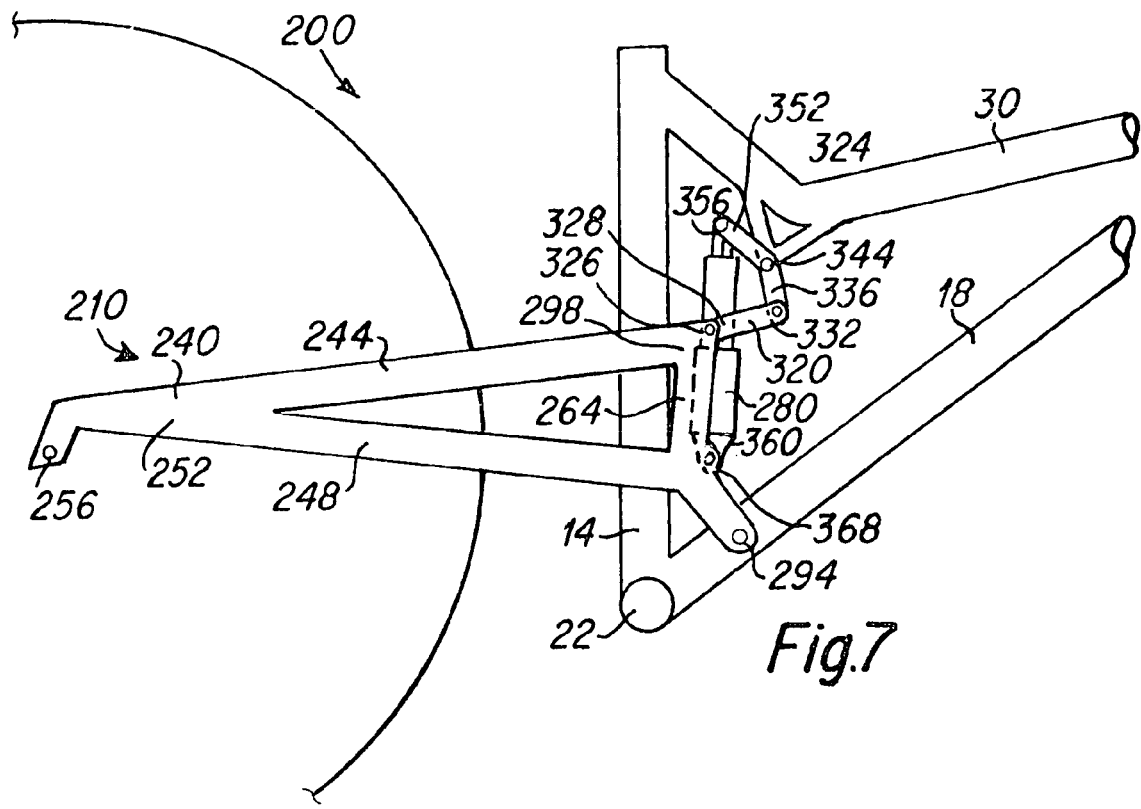
FIG. 7 is a side view of a bicycle illustrating another embodiment of a wheel suspension system of the present invention.

Another example of a single pivot point bicycle frame 200 of the present invention is depicted in FIG. 7, and structural elements of the frame depicted in FIG. 7 that correspond to structural elements previously described with regard to FIGS. 1, 2, 5 and 6 are correspondingly numbered for ease of comprehension. As is discussed below, in frame 200 the swingarm motion is resisted by the shock-absorber, where the rate of vertical motion of the rear axle changes with respect to the rate of compression of the shock absorber according to the relationship SR=ΔSL/ΔVWT, wherein dSR/dVWT has a sign change, as is described above.

As depicted in FIG. 7, the bicycle frame 200 generally includes the seat tube 14 and down tube 18, both of which are attached to a bottom bracket 22, and the top tube 30. The rear wheel suspension system 210 generally includes the rear wheel swingarm 240 that includes the pair of seat stays 244 and chain stays 248 that are joined to each other at their rearward ends 252 proximate the rear wheel axle 256. The front stays 264 are engaged between the chain stays 248 and the seat stays 244 and the shock absorber 280 is engaged to the swingarm to control the motion of the swingarm relative to the bicycle frame members, thereby controlling the motion of the rear wheel.

The lower frontward end of the swingarm structure 240, proximate the frontward end of the front stays 264, is pivotally attached utilizing a pivot pin 294 or the like to the bicycle frame proximate the bottom bracket 22, such that the swingarm rotates about the single pivot axis 294. The upper end of the swingarm, proximate the frontward end 298 of the seat stays 244 is engaged through the linkage structure 302 to the bicycle frame proximate the joinder of the seat tube 14 and top tube 30. The shock-absorber compression is controlled at one end by a plurality of links of the linkage 302, driven by the swingarm motion. This linkage 302 includes a straight connecting link 320 and a rocker link 324. The connecting link 320 is pivotally attached by a pivot 326 at a first end 328 to the forward end 298 of the seat stay 244, and pivotally attached at a second end 332 to a first arm 336 of the rocker link 324.

The rocker link 324 is pivotally attached at a generally centrally located pivot point 344 to the bicycle frame 12 and rotates about this pivot 344. A second arm 352 of the rocker link 324 is pivotally attached to one end 356 of the piston arm of the shock-absorber 280. The second end 360 of the shock-absorber 280 is pivotally attached proximate the front stays 264 of the swingarm 240 with a shock mount 368, although it can also be attached to the chain stays 248.

In a second exemplary embodiment of the present invention 200, the swingarm includes a chain stay having a length of approximately 500 mm and a seat stay having a length of approximately 450 mm, where the angle between the chain stay and seat stay is approximately 18 degrees. The shock absorber is a compression shock absorber having an uncompressed length of approximately 200 mm, with a usable stroke of approximately 50 mm, such as a shock absorber manufactured by Fox Racing Shox, model Float®. The connecting link has a pivot to pivot length of approximately 55 mm, the first arm of the rocker link has a pivot to pivot length of approximately 36 mm and the second arm of the rocker link has a pivot to pivot length of approximately 50 mm, where the angle between the arms of the rocker link is approximately 158 degrees.

The swingarm pivot axis 294 is located approximately 70 mm above the axis of the bottom bracket 22. The horizontal distance between the swingarm pivot axis 294 and the bottom bracket axis 22 can be altered to suit various frame configurations. The angle between the rocker link arm 352 and the shock absorber is generally acute at the beginning of the travel (approximately 43 degrees), and becomes less acute as the suspension is compressed, with a total angle change of approximately 40 degrees throughout the range of travel. The position of the lower shock mount 368 on the swingarm is 35 mm behind and 55 mm above the swingarm pivot axis 294.

The stationary pivot 344 of the rocker link 124 is located above and slightly forward of the main swingarm pivot 294, and above and forward of the connecting link/seat stay pivot 326. The connecting link/seat stay attachment point 326 is located above and rearward of the swingarm pivot axis 294, and the placement of the swingarm shock mount 368 is above and rearward of the swingarm pivot 294.

During rear wheel upward travel, the rocker link 324 rotates in a counter-clockwise direction, with an increasing angular velocity. The connecting link 320 rotates in a clockwise direction, and the angular velocity of the connecting link increases during the range of vertical wheel travel. Where a different shock absorber is utilized, having a differing length or where a different amount of vertical wheel travel is desired, the dimensions given above may be varied in such a manner as to achieve the desired variable shock rate properties of the present invention.

It can therefore be appreciated that as the swingarm moves upward, the shock compression is changed by both the motion of the links as described, and the motion of the swingarm. The sum of the rocker link motion and swingarm shock mount motion is configured to change the shock compression rate (SR) as the swingarm is moved throughout the range of travel, and FIG. 8 is a graph that depicts the shock rate (SR) throughout the vertical wheel travel (VWT) of the swingarm 240.

Figure 8:
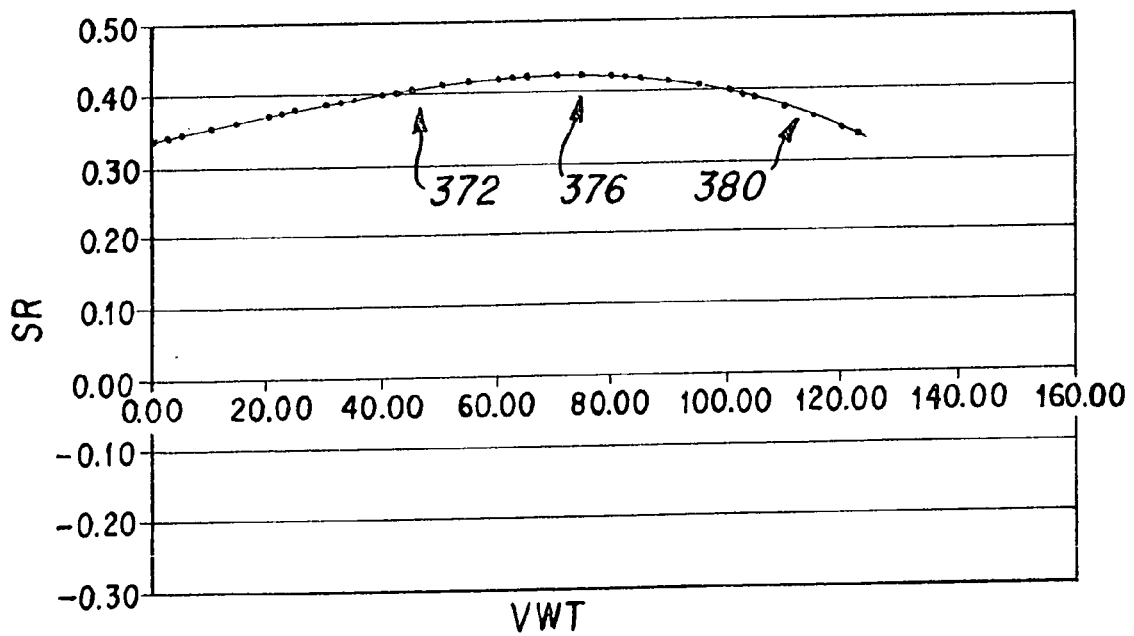
FIG. 8 is a graph depicting the shock rate versus vertical wheel travel of the bicycle depicted in FIG. 7.
Figure 9:
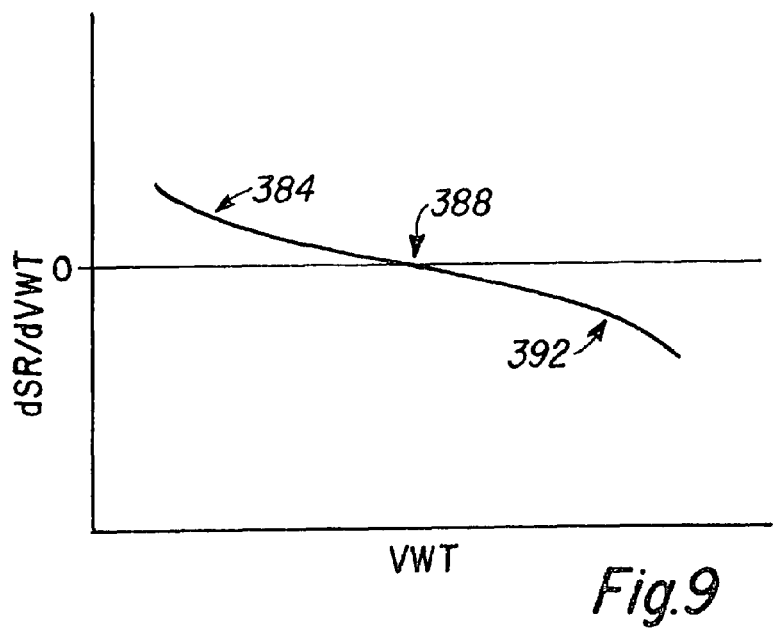
FIG. 9 is a graph depicting the change in the shock rate versus vertical wheel travel of the bicycle depicted in FIG. 7.

As can be seen in FIG. 8, the shock rate (SR) has as initial portion 372 that increases in value, has a portion 376 of essentially zero change in value and a portion 380 of decreasing value. FIG. 9 is a graph depicting this change in the shock rate with respect to the vertical wheel travel. The rate of change in the shock rate is seen to first be positive 384, then zero 388, and then negative and decreasing 392 throughout the vertical wheel travel. The result is a shock rate that has a rate of change (dSR/dVWT) that has a positive value during the first portion 384 of the wheel travel, goes through a sign change at a zero change rate 388, and changes to a negative value during the later portion 392 of the wheel travel as shown in FIGS. 8 and 9.

Various linkage configurations can be employed by those versed in the art to achieve sign change of the dSR/dVWT value for varying shock absorbers and varying amounts of rear wheel travel, as well as the peak values of both negative and positive values among others. The linkages shown are merely exemplary embodiments of a bicycle suspension which has a rear axle path based on a single pivot.

Figure 10:
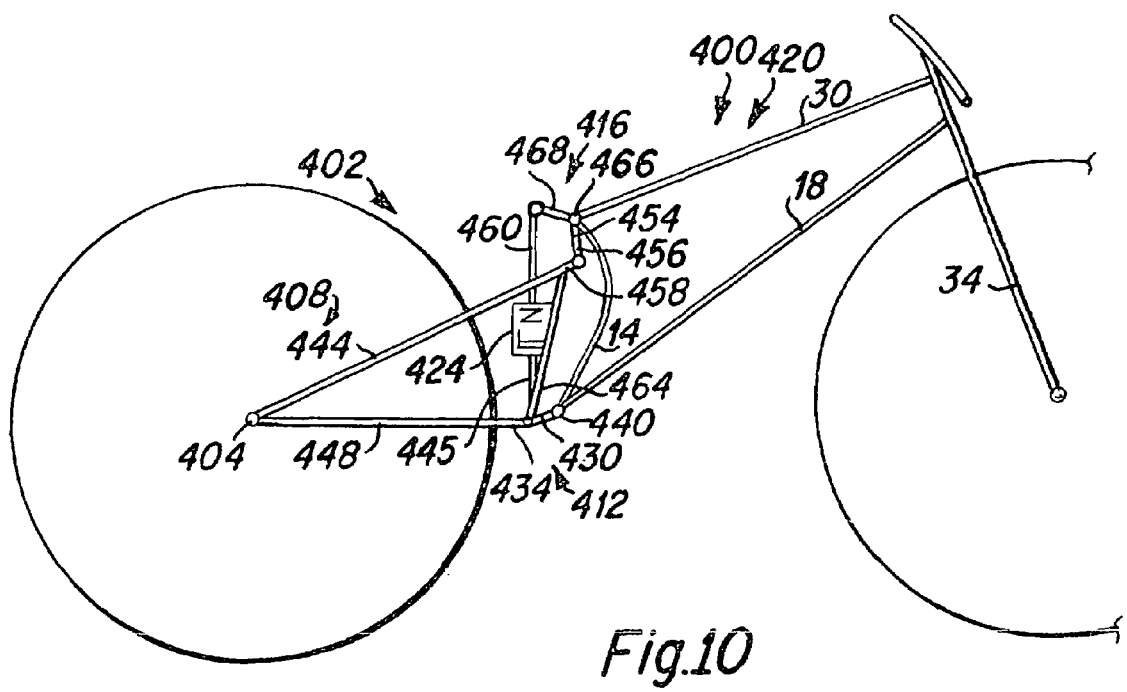
FIG. 10 is a schematic side view of a bicycle illustrating another embodiment of a wheel suspension system of the present invention.
Figures 11, 12:
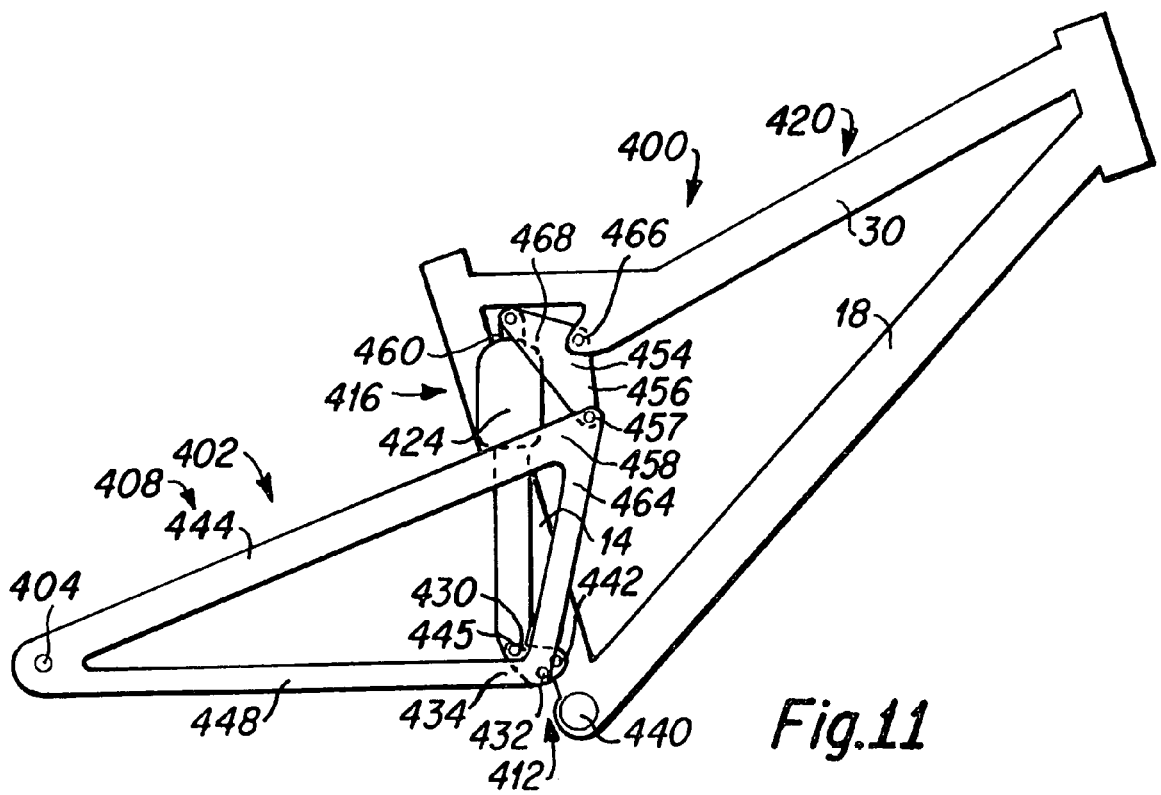
FIG. 11 is an enlarged drawing of the bicycle depicted in FIG. 10.
FIG. 12 is a graph depicting the shock rate versus vertical wheel travel of the bicycle depicted in FIG. 7.

FIG. 10 is a schematic diagram showing another bicycle embodiment 400 of the present invention using a suspension system 402 that moves the rear wheel axle 404 via a swingarm 408 connected to a pair of linkages 412 and 416 that are each pivotally attached at one end to the swingarm 408, and pivotally attached at a second end to the mainframe 420 of the bicycle 400; FIG. 11 is an enlarged depiction of the bicycle 400 depicted in FIG. 10. The frame 420 includes the seat tube 14, down tube 18, and top tube 30, and the swingarm 408 includes seat stays 444, chain stays 448 and front stays 464. The swingarm motion is resisted by a shock absorber 424, such that the shock rate SR varies with vertical wheel travel, and the rate of change of the shock rate dSR/dVWT has a change in sign during the vertical wheel travel, as has been described above.

As is best seen in FIG. 11, the lower linkage 412 includes a connecting link 430 that is pivotally attached at its rearward end 432 to the lower forward corner 434 of the swingarm 408, and pivotally attached at its forward end pivot attachment 442 to the main frame 420 proximate the bottom bracket 440. The link 430 is also pivotally connected proximate its rearward end 432 to the lower end 445 of the shock absorber 424.

The upper linkage 416 includes a rocker link 454 that includes a first arm 456 that is pivotally attached at pivot 457 to the upper forward corner 458 of the swingarm 408 at one end, and connected at a central pivot 466 to the mainframe of the bicycle 400 proximate the middle of the rocker link 454. The shock absorber 424 is pivotally connected at its upper end 460 to the outer end of the second arm 468 of the rocker link 454.

In an exemplary embodiment of the present invention 400, the swingarm includes a chain stay 448 having a length of approximately 400 mm and a seat stay 444 having a length of approximately 490 mm, where the included angle between the chain stay and seat stay is approximately 26 degrees. A suitable shock absorber is a compression shock absorber having an uncompressed length of approximately 297 mm, with a usable stroke of approximately 60 mm. The connecting link 430 has a pivot to pivot length of approximately 18 mm, the first arm 456 of the rocker link 454 has a pivot to pivot length of approximately 65 mm and the second arm 468 of the rocker link has a pivot to pivot length of approximately 59 mm, where the included angle between the arms of the rocker link is approximately 116 degrees. The angle between the rocker link arm 468 and the shock absorber is generally acute at the beginning of the travel (approximately 62 degrees), and becomes less acute as the suspension is compressed, with a total angle change of approximately 25 degrees throughout the range of travel.

The stationary pivot 466 of the rocker link 454 is located above and slightly forward of the pivot attachment 442 of the connecting link 430, and above and slightly rearward of the upper swingarm connecting pivot 457. The rocker link 454 rotates in a counter-clockwise direction, with an increasing angular velocity during the first part of the wheel travel to a maximum angular velocity approximately halfway through the travel, and a decreasing angular velocity throughout the second portion of the wheel travel. The connecting link 430 rotates in a clockwise direction, and the angular velocity of the connecting link increases during the range of vertical wheel travel. Where a different shock absorber is utilized, having a differing length or where a different amount of vertical wheel travel is desired, the dimensions given above may be varied in such a manner as to achieve the desired variable shock rate properties of the present invention.

Figure 13:
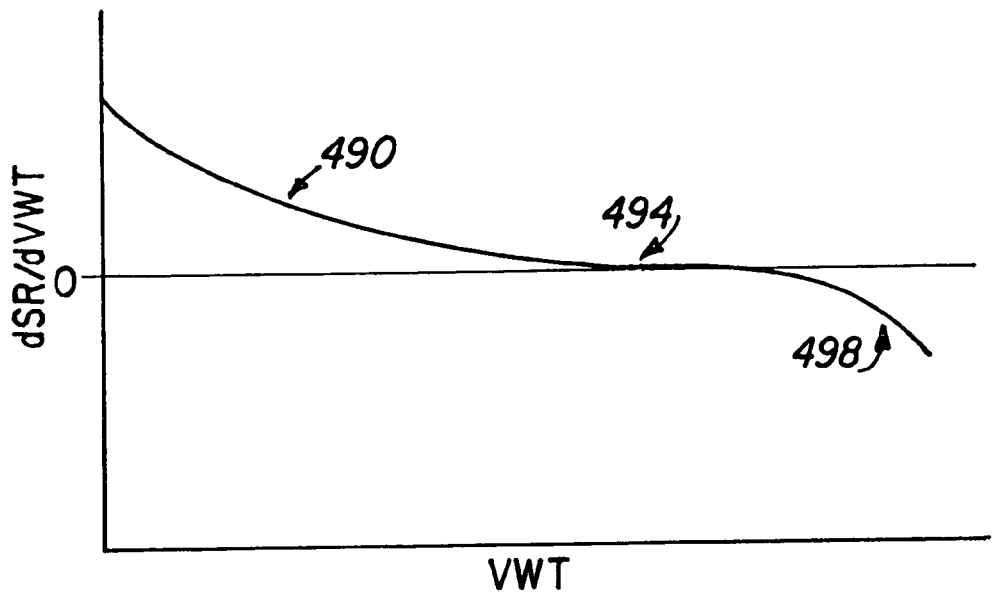
FIG. 13 is a graph depicting the change in the shock rate versus vertical wheel travel of the bicycle depicted in FIG. 7.

As the swingarm is moved during vertical wheel travel, the shock rate (SR) has a rate of change (dSR/dVWT) that has a positive value during the first portion of the wheel travel, and changes sign to a negative value during the later portion of the travel as shown in FIGS. 12 and 13 due to the combined motion of the first and second linkages.

FIG. 12 is a graph that depicts the shock rate (SR) throughout the vertical wheel travel (VWT) of the swingarm 408. As can be seen in FIG. 12, the shock rate (SR) has an initial portion 480 that increases in value, has a portion 484 of essentially zero change in value, and a portion 488 of decreasing value. FIG. 13 is a graph depicting this change in the shock rate with respect to the vertical wheel travel. The rate of change in the shock rate is seen to have an initial portion 490 to first be positive, then a sign change 494 and then a portion 498 that is negative in value throughout the vertical wheel travel.

Figure 14:
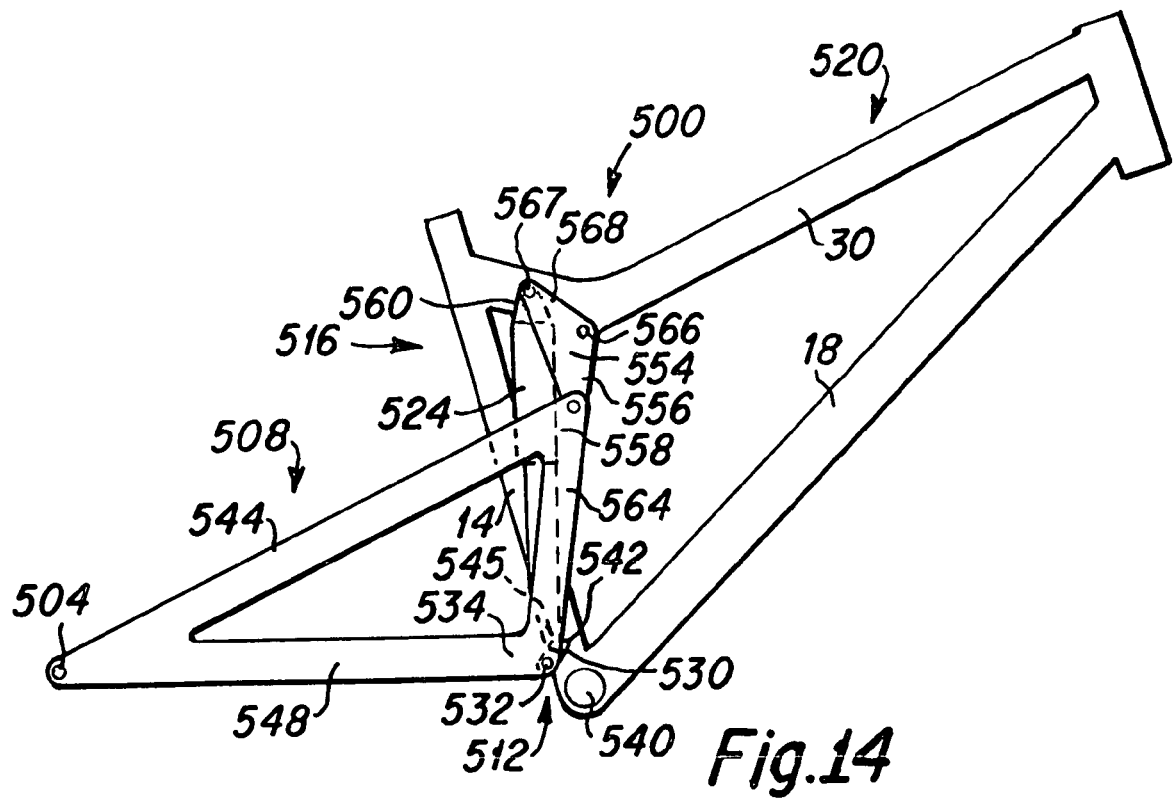
FIG. 14 is a side view of a bicycle illustrating another embodiment of a wheel suspension system of the present invention.

FIG. 14 depicts another bicycle embodiment 500 of the present invention using a suspension system 502 that moves the rear wheel axle 504 via a swingarm 508 connected to a pair of linkages 512 and 516 that are each pivotally attached at one end to the swingarm 508, and pivotally attached at a second end to the mainframe 520 of the bicycle 500. The frame 520 includes the seat tube 14, down tube 18, and top tube 30, and the swingarm 508 includes seat stays 544, chain stays 548 and front stays 564. The swingarm motion is resisted by a shock absorber 524, such that the shock rate SR varies with vertical wheel travel, and the rate of change of the shock rate dSR/dVWT has a change in sign during the vertical wheel travel, as has been described above.

The lower linkage 512 includes a connecting link 530 that is pivotally attached at its rearward end 532 to the lower forward corner 534 of the swingarm 508, and pivotally attached at its forward end 542 to the main frame 520 proximate the bottom bracket 540. The link 530 is also pivotally connected on its rear pivot axis 532 to the lower end 545 of the shock absorber 524.

The upper linkage 516 includes a rocker link 554 that includes a first arm 556 that is pivotally attached to the upper forward corner 558 of the swingarm 508 at one end, and connected at a central pivot 566 to the mainframe of the bicycle 500 proximate the middle of the rocker link 554. The shock absorber 524 is pivotally connected at its upper end 560 to the outer end pivot 567 of the second arm 568 of the rocker link 554.

In an exemplary embodiment of the present invention 500, the swingarm includes a chain stay 548 having a length of approximately 400 mm and a seat stay 544 having a length of approximately 480 mm, where the included angle between the chain stay and seat stay is approximately 27 degrees. A suitable shock absorber is a compression shock absorber having an uncompressed length of approximately 320 mm, with a usable stroke of approximately 50 mm. The connecting link 530 has a pivot to pivot length of approximately 18 mm. The first arm 556 of the rocker link 554 has a pivot to pivot length of approximately 65 mm and the second arm 568 of the rocker link has a pivot to pivot length of approximately 60 mm, where the included angle between the arms of the rocker link is approximately 116 degrees. The angle between the rocker link arm 568 and the shock absorber is generally acute at the beginning of the travel (approximately 49 degrees), and becomes less acute as the suspension is compressed, with a total angle change of approximately 35 degrees throughout the range of travel.

The stationary pivot 566 of the rocker link 554 is located above and forward of the axis of the bottom bracket 540, and above and slightly rearward of the upper swingarm link pivot 558. The rocker link 554 rotates in a counter-clockwise direction, with an increasing angular velocity during the first part of the wheel travel to a maximum angular velocity approximately halfway through the travel, and a decreasing angular velocity throughout the second portion of the wheel travel. The connecting link 530 rotates in a clockwise direction, and the angular velocity of the connecting link decreases during the range of vertical wheel travel. Where a different shock absorber is utilized, having a differing length or where a different amount of vertical wheel travel is desired, the dimensions given above may be varied in such a manner as to achieve the desired variable shock rate properties of the present invention.

Figure 15:
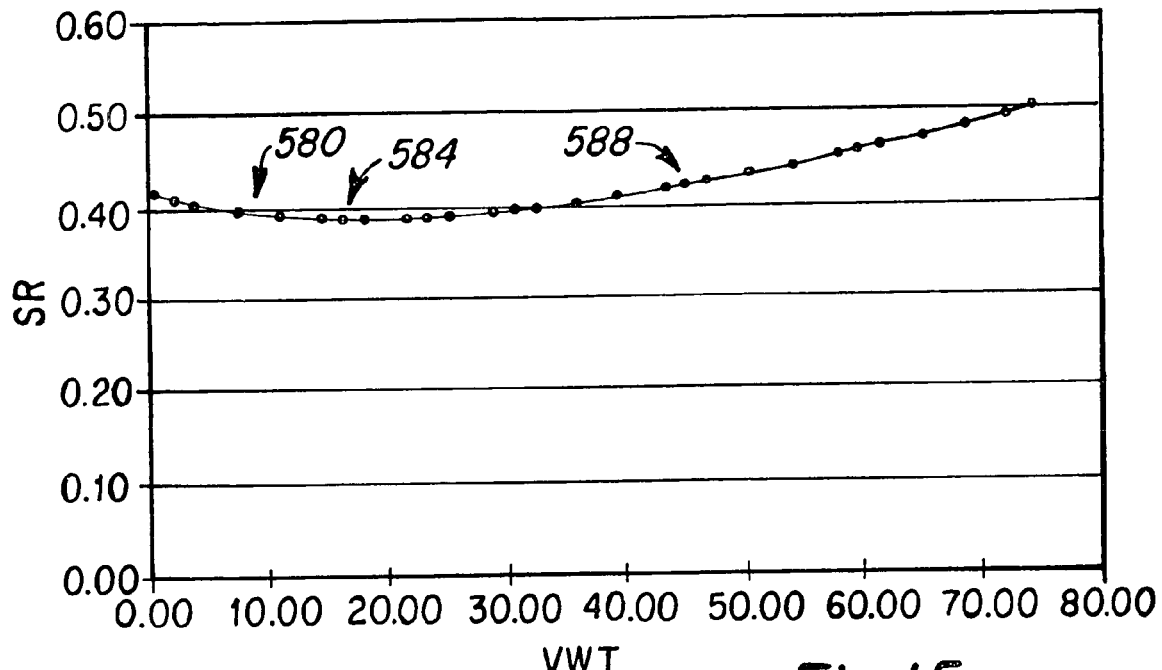
FIG. 15 is a graph depicting the shock rate versus vertical wheel travel of the bicycle depicted in FIG. 7.
Figure 16:
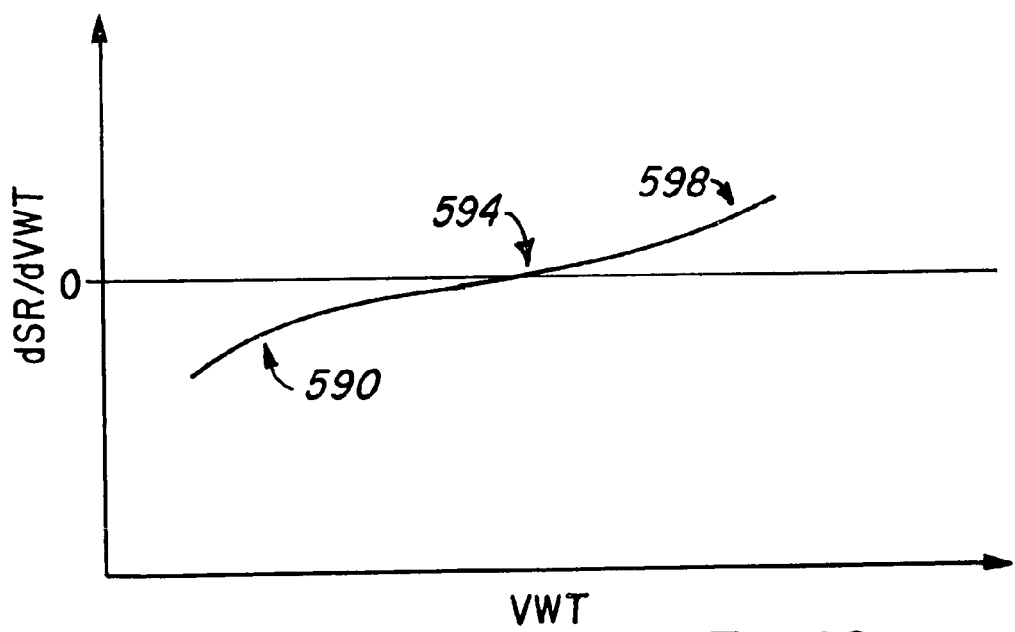
FIG. 16 is a graph depicting the change in the shock rate versus vertical wheel travel of the bicycle depicted in FIG. 7.

As the swingarm is moved during vertical wheel travel, the shock rate (SR) has a rate of change (dSR/dVWT) that has a negative value during the first portion of the wheel travel, and changes sign to a positive value during the later portion of the travel as shown in FIGS. 15 and 16 due to the combined motion of the first and second linkages.

FIG. 15 is a graph that depicts the shock rate (SR) throughout the vertical wheel travel (VWT) of the swingarm 508. As can be seen in FIG. 15, the shock rate (SR) has an initial portion 580 that decreases in value, has a portion 584 of essentially zero change in value, and a portion 488 of increasing value. FIG. 16 is a graph depicting this change in the shock rate with respect to the vertical wheel travel. The rate of change in the shock rate is seen to have an initial portion 590 to first be negative, then a sign change 594 and then a portion 598 that is positive in value throughout the vertical wheel travel.

A feature of some of the exemplary embodiments of the present invention is that neither of the two ends of the shock absorber is directly engaged to the main frame of the bicycle, however this shock absorber engagement configuration is not required in order to realize the variable shock rate feature of a bicycle of the present invention. For instance, regarding the exemplary embodiment of a single pivot swingarm bicycle, depicted in FIGS. 1-9, the lower end of the shock absorber is pivotally engaged to the swingarm, and the swingarm is then pivotally engaged to the bicycle frame at a single pivot point 94. The upper end of the shock absorber is engaged to the rocker link 124, which is then engaged at its central pivot point to the main frame of the bicycle. With regard to the bicycles 400 and 500, both the lower end and the upper end of the shock absorber are engaged to links that are pivotally attached to the main frame. Thus, in some of the exemplary embodiments of the present invention, neither end of the shock absorber is directly engaged to the main frame of the bicycle, such as through a single pivot point engagement.

Generally, suspension systems are used for making a vehicle more comfortable to ride, as well as increasing traction and vehicle control by keeping the wheels on the ground. An advantage of using a bicycle having a changing shock rate that has a sign change from negative to positive is that it can increase rider comfort by providing more vertical wheel travel for a given bump as well as controlling the end of the vertical wheel travel to prevent it from bottoming out, causing discomfort when a large impact is experienced.

Using a bicycle having a shock rate having a sign change from positive to negative has advantages for certain applications. In this case, the first part of the suspension travel gives the wheel a high mechanical advantage, allowing the wheel to stay on the ground at high speeds and through depressions without disrupting the vehicle as the wheel moves from a depression to a bump at a high rate of speed. The decrease in rate toward the end of the travel is designed to maximize VWT with the use of a shock absorber that has an increasing spring rate in this area. The increase in spring rate can be made possible by the use of polymer bumpers, but can also be controlled through other means in the spring/damper system, as is well known to those skilled in the art. Linkage configurations can be manipulated to provide varying suspension characteristics, and/or dSR/dVWT values with a change of sign. This application discloses embodiments that are exemplary configurations of the swingarm linkage design of bicycles of the present invention.

While the present invention has been shown and described with regard to certain preferred embodiments, it is to be understood that modifications in form and detail will no doubt be developed by those skilled in the art upon reviewing this disclosure. It is therefore intended that the following claims cover all such alterations and modifications that nevertheless include the true spirit and scope of the inventive features of the present invention.

What I claim is:

1. A bicycle including:
a bicycle frame;
a rear wheel suspension system being attached to the frame, wherein the rear wheel suspension system includes a rear wheel swingarm that is attached to said bicycle frame at a single swingarm pivot axis; said swingarm including a rigid triangular structure including a chain stay, a seat stay and a front stay; and a shock absorber that is engaged to said swingarm to control the motion of a rear wheel (VWT) of a rear wheel of the bicycle, said shock absorber having a first end and a second end, wherein neither of said ends is directly engaged to said frame; and wherein said first end of said shock absorber is pivotally engaged to said swingarm and said second end of said shock absorber is pivotally engaged to a link that is pivotally engaged to said frame.

2. A bicycle frame as described in claim 1, wherein said swingarm is pivotally engaged to a connecting link and said connecting link is pivotally engaged to said link that is pivotally engaged to said frame.

3. A bicycle frame as described in claim 2 wherein said link that is pivotally engaged to said frame is a rocker link having two arms and a central pivot that is engaged to said frame, wherein one said arm is pivotally engaged to said connecting link and another said arm is pivotally engaged to said second end of said shock absorber.

4. A bicycle frame as described in claim 1, wherein said seat stay and said chain stay are fixedly engaged together by said front stay.

5. A bicycle frame as described in claim 4, wherein said shock absorber has length (SL) between said first and said second end, and wherein a change in said vertical wheel travel (ΔVWT) of said rear wheel is related to a change in said length of the shock absorber (ΔSL) to provide a shock rate (SR) according to the relationship:

$$SR=\Delta SL/\Delta VWT,$$

and wherein the shock rate (SR) changes throughout the vertical wheel travel of said rear wheel, such that the change in the shock rate dSR/dVWT has a change in sign as the rear wheel travels through the vertical wheel travel.

6. A bicycle frame as described in claim 5, wherein said shock rate first decreases, then reaches a minimum value and then increases throughout the vertical wheel travel of said rear wheel.

7. A bicycle frame as described in claim 6 wherein said connecting link has a length of approximately 60 mm, said first arm of said rocker link has a length of approximately 50 mm and said second arm has a length of approximately 45 mm, and wherein said first end of said shock absorber is engaged to said swingarm approximately 57 mm above, and 83 mm behind said swingarm pivot axis, wherein said swingarm is pivotally connected to said connector link and said connector link is pivotally to said rocker link.

8. A bicycle including:
a bicycle frame;
a rear wheel suspension system being attached to the frame, wherein the rear wheel suspension system includes a rear wheel swingarm and a shock absorber that is attached to said bicycle frame at a single swingarm pivot axis; and shock absorber that is engaged to said swingarm to control the vertical wheel travel (VWT) of a rear wheel of the bicycle, said shock absorber having a first end and a second end, wherein neither of said ends is directly engaged to said frame; and wherein said first end of said shock absorber is pivotally engaged to said swingarm and said second end of said shock absorber is pivotally engaged to a link that is pivotally engaged to said frame;
wherein said shock absorber has length (SL) between said first and said second end, and wherein a change in said vertical wheel travel (ΔVWT) of said rear wheel is related to a change in said length of the shock absorber (ΔSL) to provide a shock rate (SR) according to the relationship:

$$SR=\Delta SL/\Delta VWT,$$

and wherein the shock rate (SR) changes throughout the vertical wheel travel of said rear wheel, such that the change in the shock rate dSR/dVWT has a change in sign as the rear wheel travels through the vertical wheel travel.

9. A bicycle frame as described in claim 8, wherein said shock rate first decreases, then reaches a minimum value and then increases throughout the vertical wheel travel of said rear wheel.

10. A bicycle frame as described in claim 9 wherein said connecting link has a length of approximately 60 mm, said first arm of said rocker link has a length of approximately 50 mm and said second arm has a length of approximately 45 mm, and wherein said first end of said shock absorber is engaged to said swingarm approximately 57 mm above, and 83 mm behind said swingarm pivot axis.

11. A bicycle frame as described in claim 8, wherein said shock rate first increases, then reaches a maximum value and then decreases throughout the vertical wheel travel of said rear wheel.

12. A bicycle frame as described in claim 11 wherein said connecting link has a length of approximately 55 mm, said first arm of said rocker link has a length of approximately 36 mm and said second arm has a length of approximately 50 mm, and wherein said first end of said shock absorber is engaged to said swingarm approximately 55 mm above, and 35 mm behind said swingarm pivot axis.

13. A bicycle including:
- a bicycle frame;
- a rear wheel suspension system being attached to the frame, wherein the rear wheel suspension system includes a rear wheel swingarm and a shock absorber that is engaged to said swingarm to control the vertical wheel travel (VWT) of a rear wheel of the bicycle, said shock absorber having a first end and a second end and a length (SL) of said shock absorber between said first end and a second end, wherein neither of said ends is directly engaged to said frame;
- a first swingarm movement control means functioning to pivotally engage said first end of said shock absorber with said swingarm;
- a second swingarm movement control means including a rocker link and a connecting link that function to engage said second end of said shock absorber with said frame and with said swingarm; and
- wherein said first swingarm movement control means and said second swingarm movement control means further function such that a chance in said vertical wheel travel (ΔVWT) of said rear wheel is related to a change in the length of the shock absorber (ΔSL) to provide a shock rate (SR) according to the relationship:

$$SR = \Delta SL / \Delta VWT,$$

and wherein the shock rate (SR) changes throughout the vertical wheel travel of said rear wheel, such that the change in the shock rate dSR/dVWT has a change in sign as the rear wheel travels through the vertical wheel travel.

14. A bicycle frame as described in claim 13, wherein said shock rate first decreases, then reaches a minimum value and then increases throughout the vertical wheel travel of said rear wheel.

15. A bicycle frame as described in claim 13, wherein said sign change is from negative to positive.

16. A bicycle frame as described in claim 13, wherein said shock rate first increases, then reaches a maximum value and then decreases throughout the vertical wheel travel of said rear wheel.

17. A bicycle frame as described in claim 13, wherein said sign change is from positive to negative.

18. A bicycle frame as described in claim 13, wherein said swingarm is pivotally connected to sais connector link is pivotally to said rocker link.

19. A bicycle frame as described in claim 18, wherein said second end of said shock absorber is pivotally connected to said rocker link and said rocker link is pivotally connected to said frame.

* * * * *